US012693386B2

(12) United States Patent
Jia et al.

(10) Patent No.: US 12,693,386 B2
(45) Date of Patent: Jul. 28, 2026

(54) LIDAR SYSTEM CAPABLE OF REALIZING 360° ROTARY SCANNING

(71) Applicant: Huaichang Jia, Zhongshan (CN)

(72) Inventors: Huaichang Jia, Zhongshan (CN);
Runjuan Yuan, Zhongshan (CN)

( * ) Notice: Subject to any disclaimer, the term of this patent is extended or adjusted under 35 U.S.C. 154(b) by 1093 days.

(21) Appl. No.: 17/805,002

(22) Filed: Jun. 1, 2022

(65) Prior Publication Data

US 2023/0324519 A1 Oct. 12, 2023

(30) Foreign Application Priority Data

Apr. 7, 2022 (CN) .......................... 202220792806.9

(51) Int. Cl.
| | |
|---|---|
| *G01S 7/481* | (2006.01) |
| *G01S 17/08* | (2006.01) |
| *G01S 17/89* | (2020.01) |
| *G01S 17/93* | (2020.01) |

(52) U.S. Cl.
CPC .......... *G01S 7/4817* (2013.01); *G01S 7/4813* (2013.01); *G01S 17/08* (2013.01); *G01S 17/89* (2013.01); *G01S 17/93* (2013.01)

(58) Field of Classification Search
CPC ....................................................... G01S 7/481
See application file for complete search history.

(56) References Cited

U.S. PATENT DOCUMENTS

| | | | | |
|---|---|---|---|---|
| 6,137,569 A | * | 10/2000 | Sasaki | G01C 15/00 |
| | | | | 356/138 |
| 2009/0180283 A1 | * | 7/2009 | Chu | G02B 27/20 |
| | | | | 362/259 |
| 2018/0355917 A1 | * | 12/2018 | Iizumi | F16C 19/466 |
| 2019/0146069 A1 | * | 5/2019 | Etschmaier | G02B 5/20 |
| | | | | 356/4.01 |
| 2019/0179127 A1 | * | 6/2019 | Mertz | G02B 27/0977 |
| 2020/0398113 A1 | * | 12/2020 | Bengtsson | A63B 24/0062 |
| 2022/0390566 A1 | * | 12/2022 | Ai | G01S 7/499 |

* cited by examiner

*Primary Examiner* — Helal A Algahaim
*Assistant Examiner* — Clara G Chilton
(74) *Attorney, Agent, or Firm* — Novoclaims Patent Services LLC; Mei Lin Wong

(57) ABSTRACT

The present invention discloses a lidar system capable of realizing 360° rotary scanning, which comprises a laser emitting unit, a laser receiving unit, a 360° scanning rotary base, an upper reflecting plane mirror and a lower reflecting plane mirror, wherein the upper reflecting plane mirror and the lower reflecting plane mirror are arranged vertically, and obliquely installed at an angle of 45° on the same side of the rotary base, and rotate around a vertical central axis S of the rotary base; electronic components such as the laser emitting unit and the laser receiving unit do not rotate with the rotary base, thus ensuring the stability, reliability and long service life of the electronic components. There is no blind area of scanning when the rotary base rotates 360°, and in the meantime wireless power supply and signal transmission are not required.

3 Claims, 12 Drawing Sheets

9

10

LIDAR SYSTEM CAPABLE OF REALIZING 360° ROTARY SCANNING

BACKGROUND OF THE PRESENT INVENTION

The present invention is a lidar system capable of realizing 360° rotary scanning.

DESCRIPTION OF RELATED ARTS

Lidar is a radar system that can detect the position, velocity and other characteristics of a target by emitting laser beams. With the development of laser technology, laser scanning technology is more and more widely used in measurement, transportation, driving assistance, unmanned aerial vehicles, mobile robots and other fields. At present, the scanning range of the circumferential lidar is 360°. Its principle is that the rotating mechanism rotates 360° at a high speed with the rotating frame, and electronic components such as the laser emitting unit and the laser receiving unit installed on the rotating frame rotate at a high speed along with the rotating frame, which shortens the service life of the product. Moreover, since the electronic components rotate at a high speed, power has to be supplied to the electronic components through an electric slip ring or wireless charging, which also reduces the stability, reliability and service life of the product. In addition, the wireless charging requires an additional central processing chip MCU, which leads to a complex circuit structure and a high cost. As for the other type of lidar systems, although the electronic components do not rotate, an upright boom extends out of the rotating frame to support the rotating frame, which results in a scanning blind area (that is, the area blocked by the boom) during high-speed 360° rotating scanning, and a scanning angle of about 300°.

SUMMARY OF THE PRESENT INVENTION

The invention is aimed to provide a lidar system capable of realizing 360° rotary scanning, which not only solves the technical problem that the lidar in the prior art supports the rotating frame with an upright boom, but also solves the technical problem that the service life of the product is shorted and the stability and reliability of the product is reduced due to high-speed rotation of the electronic components such as the laser emitting unit and the laser receiving unit installed on the rotating frame of the lidar.

The invention is realized by the following technical solution:

A lidar system capable of realizing 360° rotary scanning comprises a laser emitting unit, a laser receiving unit, a rotary base, an upper reflecting plane mirror and a lower reflecting plane mirror, wherein the upper reflecting plane mirror and the lower reflecting plane mirror are arranged vertically, and obliquely installed on a same side of the rotary base, and rotate around a vertical central axis S of the rotary base; an emitting light L1 emitted by the laser emitting unit is reflected by a second mirror and a first mirror, then projected on the upper reflecting plane mirror along the central axis S, and then laterally reflected out, and a light reflected back from an external object is horizontally projected on the lower reflecting plane mirror to form the received light L2 which enters the laser receiving unit along the central axis S; the received light L2 and the emitting light L1 are located on two sides of the rotary base; and the laser emitting unit and the laser receiving unit are located at a same end of the central axis S.

The rotary base is installed on a base and is covered with a diffuser, a first mirror is disposed at the a center of an interior of the diffuser, a second mirror is disposed at a top edge of an interior of the diffuser, and the first mirror is located directly above the upper reflecting plane mirror and is opposite to the second mirror.

The laser emitting unit is installed in a cavity of the base, and comprises a laser light source, a third mirror, a first convex lens and a fourth mirror; the light emitted by the laser light source passes through the third mirror, the first convex lens and the fourth mirror in turn, and is reflected by the fourth mirror to reach the second mirror at an edge of an interior of the diffuser, the second mirror reflects the light to the first mirror at a top center of the interior of the diffuser, and the light reflected by the first mirror is projected to the upper reflecting plane mirror along the central axis S.

The laser receiving unit is installed in the cavity of the base, and comprises a fifth mirror, a second convex lens, a sixth mirror and a distance measuring sensor; the received light L2 formed from the lower reflecting plane mirror enters the fifth mirror, the second convex lens and the sixth reflect mirror in turn along the central axis S and then enters the distance measuring sensor.

The rotary base is driven by a driving mechanism which includes a motor, a pinion, a gear and a bearing, wherein an inner cavity is formed in a center of the gear, the bearing fits into the inner cavity of the gear, a through hole is formed in a center of the bearing, an inner wall of the bearing is installed on a top of the base, a bottom of the rotary base is installed on an end face of the gear, an output shaft of the motor is installed on the pinion, the pinion is engaged with the gear, the motor drives the pinion and the gear to rotate, the gear drives the rotary base to rotate, and the received light L2 entering the lower reflecting plane mirror passes through the through hole formed in the center of the bearing.

The bearing is a ball bearing, including an outer race, an inner race and a plurality of balls, wherein the outer race is sleeved in the inner cavity of the gear, and the inner race is mounted on the top of the base.

End faces of teeth on an edge of the gear are coated with reflective paint, wherein one short tooth is shorter than the other teeth and is not coated with the reflective paint, the teeth coated with the reflective paint form a counting and coding disk, and a photoelectric sensor is installed under the teeth to detect a rotation angle of the rotary base.

Both the included angle between the upper reflecting plane mirror and the horizontal line and that between the lower reflecting plane mirror and the horizontal line are 45°.

The bottom of the base is hollowed out to form a cavity, the motor is installed in the cavity, the pinion, the gear and the bearing are located outside the cavity and placed on a top end face of the base, an annular boss protrudes from the top end face of the base, the annular boss fits into the bearing, the annular boss has a hollow hole which is communicated with the cavity, and the received light L2 passes through the hollow hole.

A lidar system capable of realizing 360° rotary scanning comprises a laser emitting unit, a laser receiving unit, a rotary base, an upper reflecting plane mirror and a lower reflecting plane mirror, wherein the upper reflecting plane mirror and the lower reflecting plane mirror are arranged vertically and obliquely installed on the same side of the rotary base, and rotate around the vertical central axis S of the rotary base; the emitting light L1 emitted by the laser emitting unit is projected on the lower reflecting plane mirror along the central axis S, and then laterally reflected out, and the reflected light reflected back from an external object is horizontally projected on the lower reflecting plane mirror to form, along the central axis S, the received light L2 which is reflected by a second mirror and a first mirror and then enters the laser receiving unit; the received light L2 and the emitting light L1 are located on two sides of the rotary base; and the laser emitting unit and the laser receiving unit are located at the same end of the central axis S.

Compared with the prior art, the invention has the following advantages:

1. The lidar system capable of realizing 360° rotary scanning provided by invention, including the laser emitting unit, the laser receiving unit, the rotary base, the upper reflecting plane mirror and the lower reflecting plane mirror, wherein the upper reflecting plane mirror and the lower reflecting plane mirror are arranged vertically and obliquely installed on the same side of the rotary base, and rotate around the vertical central axis S of the rotary base; the emitting light L1 emitted by the laser emitting unit is reflected by the second mirror and the first mirror, then projected on the upper reflecting plane mirror along the central axis S, and then laterally reflected out, and the light reflected back from the external object is horizontally projected on the lower reflecting plane mirror to form the received light L2 which enters the laser receiving unit along the central axis S; the received light L2 and the emitting light L1 are located on two sides of the rotary base; and the laser emitting unit and the laser receiving unit are located at the same end of the central axis S. With this layout design, the electronic components such as the laser emitting unit and the laser receiving unit do not rotate with the rotary base, which ensures the stability, reliability and service life of the electronic components. Meanwhile, there is no obstacle and no scanning blind area when the rotary base rotates 360°, and wireless power supply and signal transmission is not required, which simplifies the circuit and improves the product performance.

2. Other advantages of the invention are described in detail in the embodiment of the specification.

DETAILED DESCRIPTION OF THE PREFERRED EMBODIMENT

Figure 1:
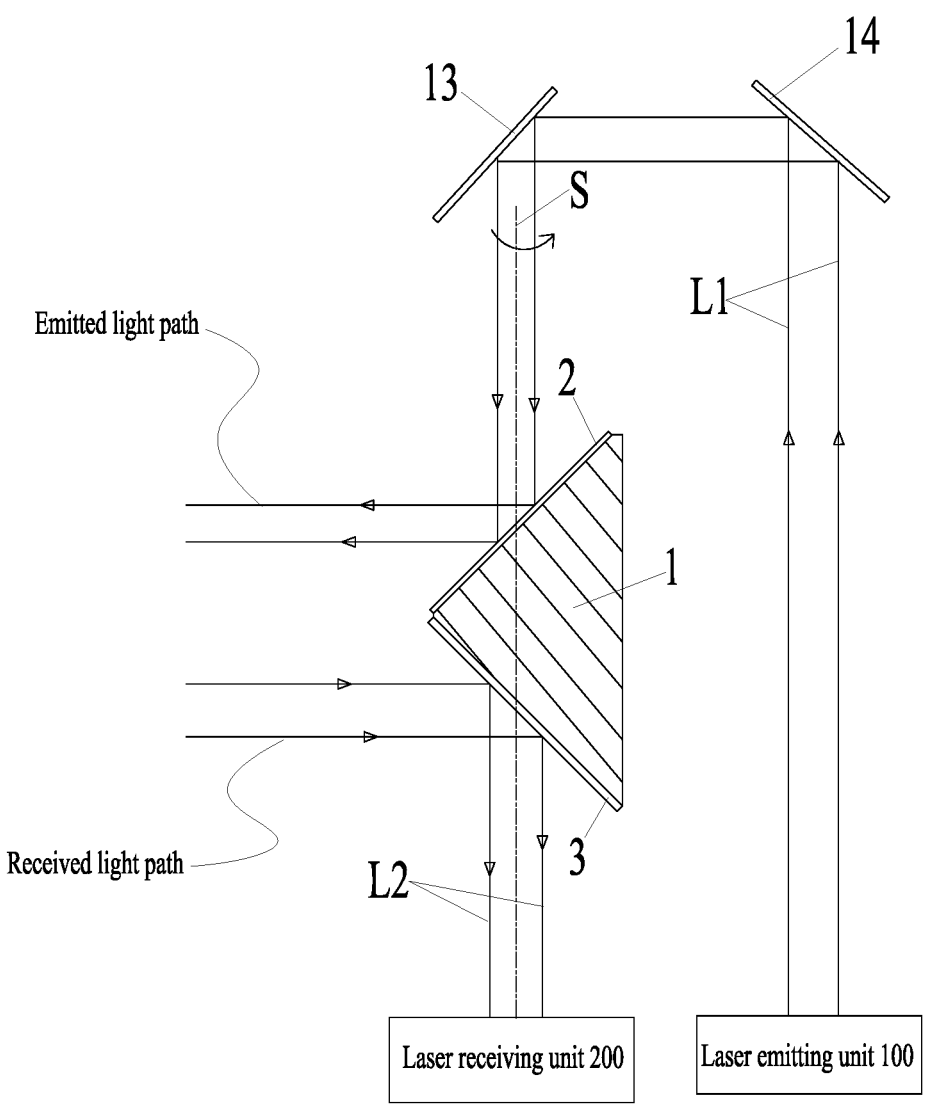
FIG. 1 is a schematic diagram of a first embodiment of the invention.
Figure 2:
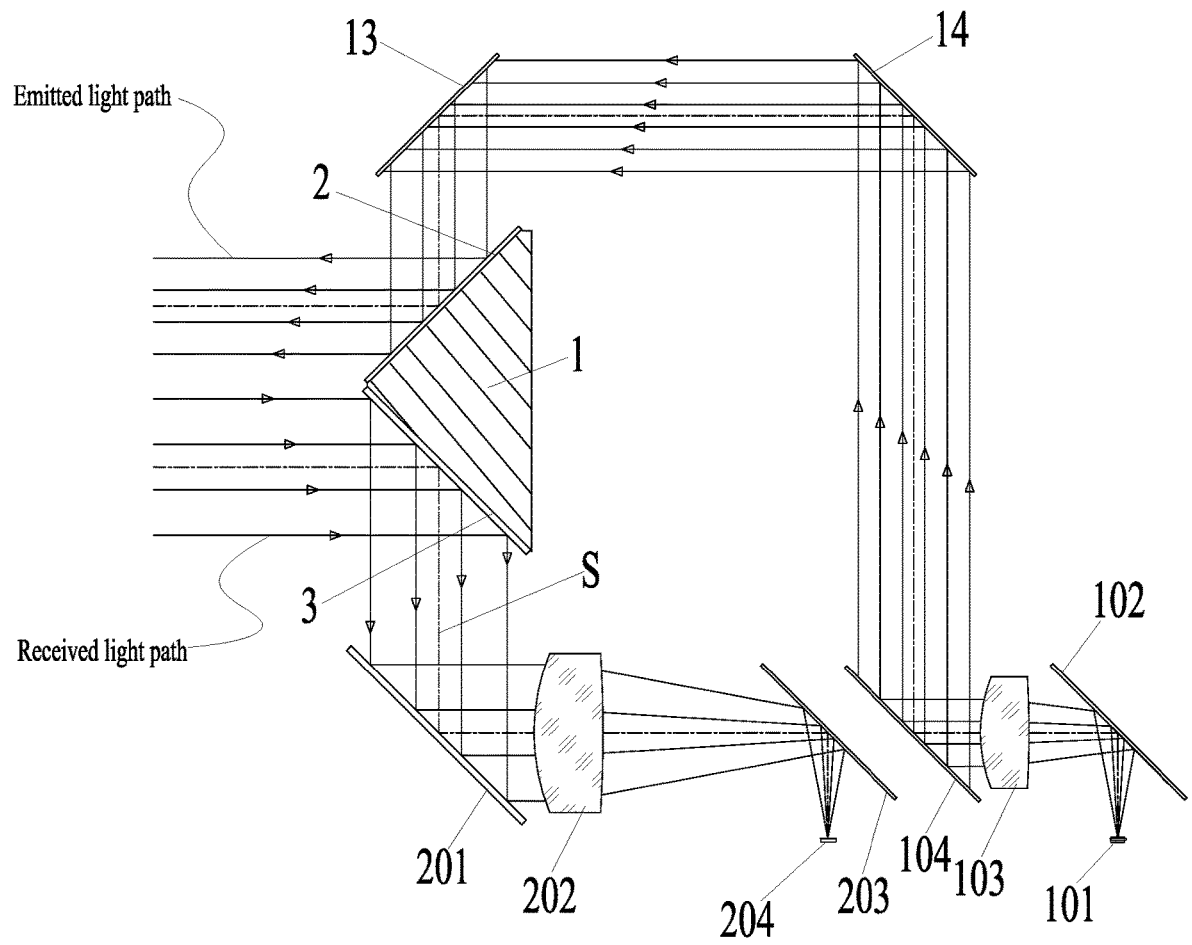
FIG. 2 is an optical schematic diagram of the first embodiment of the invention.
Figure 3:
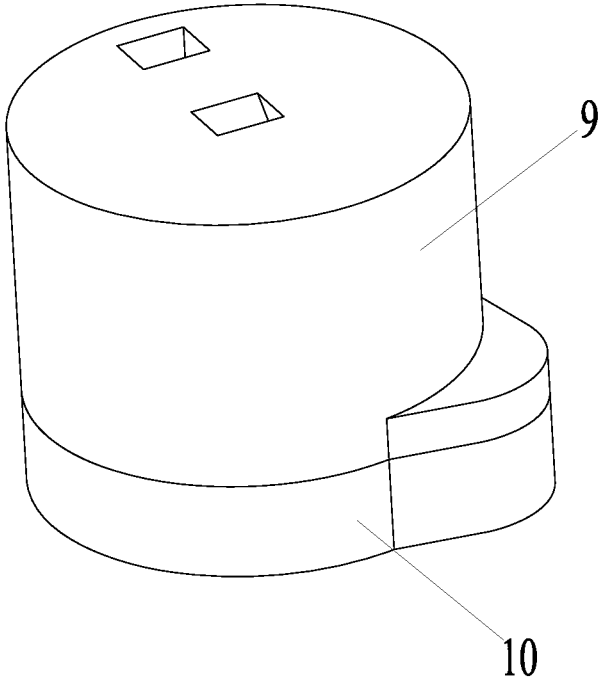
FIG. 3 is a perspective view of the first embodiment of the invention.
Figure 4:
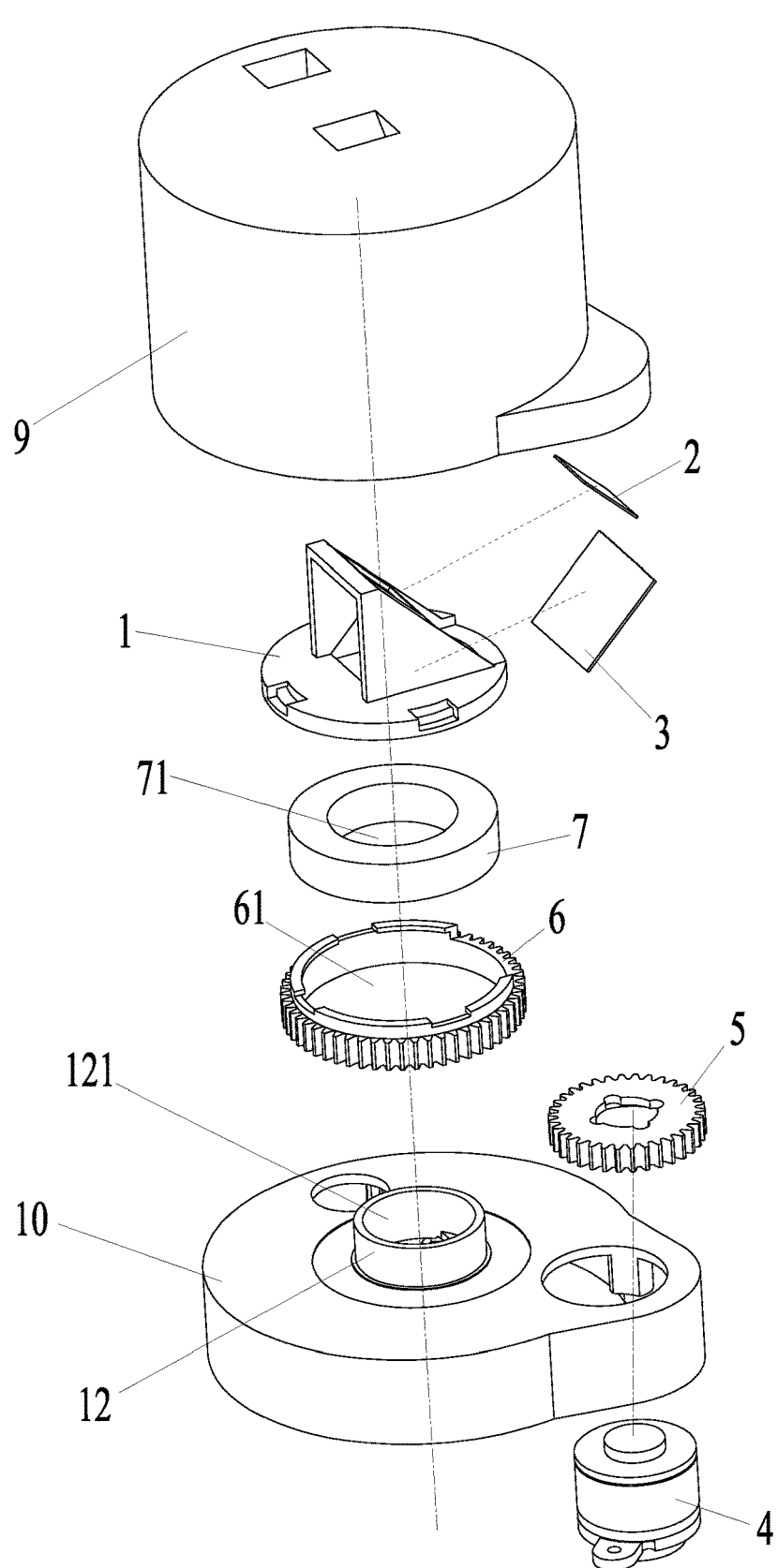
FIG. 4 is an exploded view of the first embodiment of the invention.
Figure 5:
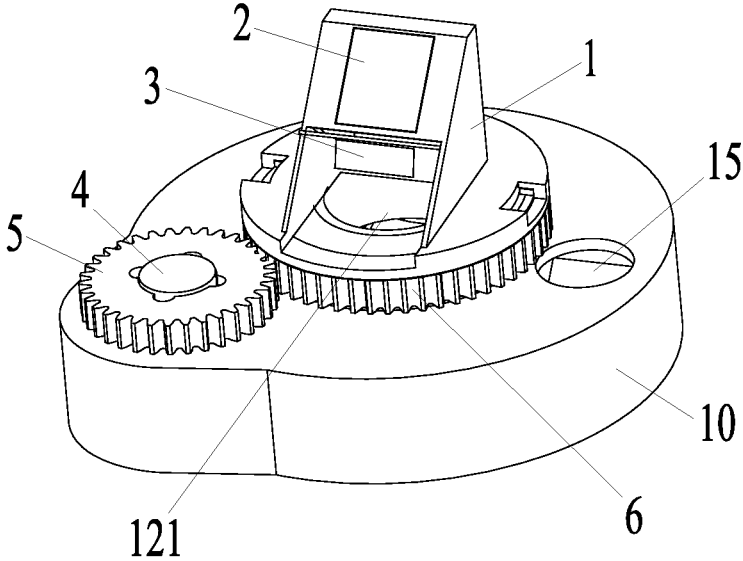
FIG. 5 is a perspective view of the first embodiment of the invention after omitting the diffuser.
Figure 6:
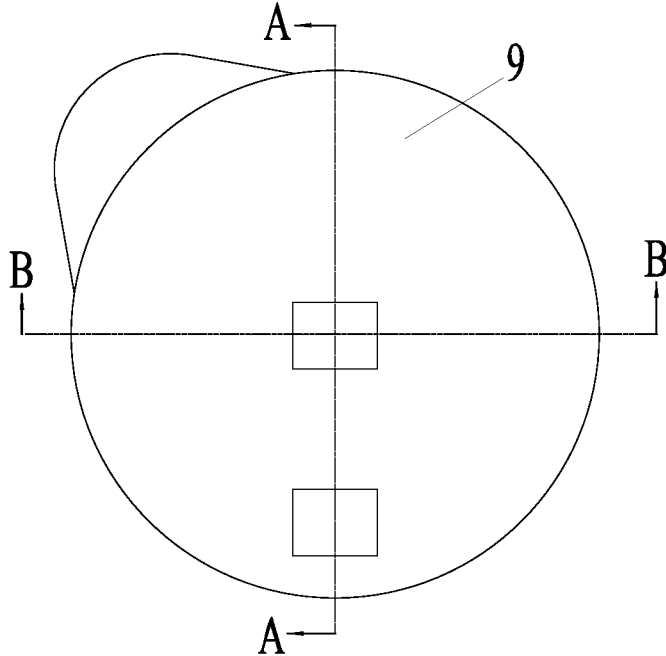
FIG. 6 is a top view of the first embodiment of the invention.
Figure 7:
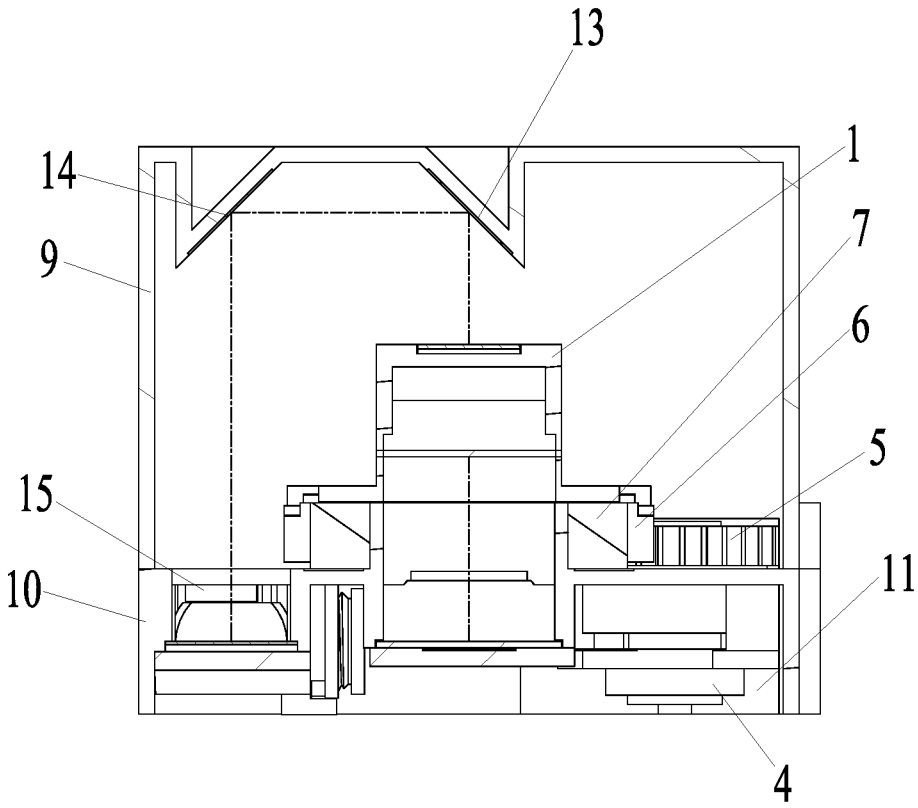
FIG. 7 is a cross-sectional view of A-A of FIG. 6.
Figure 8:
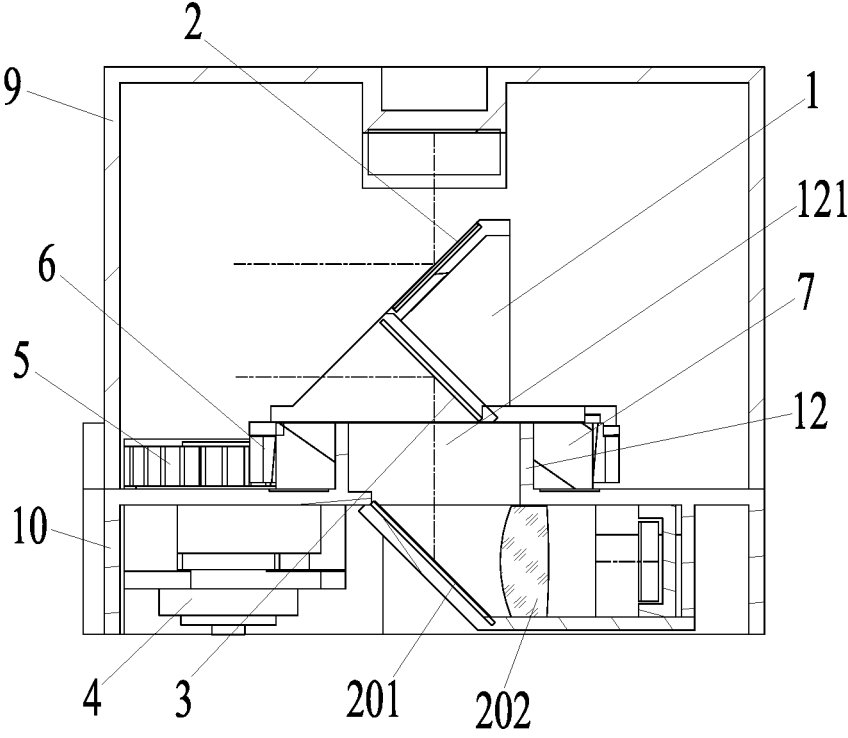
FIG. 8 is a B-B cross-sectional view of FIG. 6.

In order to make the purposes, technical resolutions and advantages of the embodiment of the invention clearer, a clear and complete description will be given hereinafter to the technical solutions of the embodiments of the invention, in combination with the drawings of the embodiments. Obviously, the embodiments described are only part of but not all the embodiments of the invention. Any other embodiments obtained by those skilled in the art based on the embodiments of the invention without contributing creative labor are all within the protection scope of the invention.

Embodiment 1

As shown in FIG. 1 to FIG. 9, this embodiment provides a lidar system capable of realizing 360° rotary scanning, characterized in that the system comprises a laser emitting unit 100, a laser receiving unit 200, a rotary base 1, an upper reflecting plane mirror 2 and a lower reflecting plane mirror 3, wherein the upper reflecting plane mirror 2 and the lower reflecting plane mirror 3 are arranged vertically, and obliquely installed at an angle of 45° on the same side of the rotary base 1, and rotate around a vertical central axis S of the rotary base 1; the emitting light L1 emitted by the laser emitting unit 100 is reflected by the second mirror 14 and first mirror 13, then projected on the upper reflecting plane mirror 2 along the direction of central axis S, and then laterally reflected out, and the reflected light reflected back from an external object is horizontally projected on the lower reflecting plane mirror 3 to form the received light L2 which enters the laser receiving unit 200 along the central axis S; the received light L2 and the emitting light L1 are located on two sides of the rotary base 1; and the laser emitting unit 100 and the laser receiving unit 200 are located at the same end of the central axis S. With this layout design, the electronic components such as the laser emitting unit and the laser receiving unit do not rotate with the rotary base, which ensures the stability, reliability and service life of the electronic components. Meanwhile, there is no obstacle and no scanning blind area when the rotary base rotates 360°, and wireless power supply and signal transmission is not required, which reduces the product cost.

The rotary base 1 is installed on a base 10 and is covered with a diffuser 9, the first mirror 13 is disposed at the top center of the interior of the diffuser 9, the second mirror 13 is disposed at the top edge of the interior of the diffuser 9, and the first mirror 13 is located directly above the upper reflecting plane mirror 2 and is opposite to the second mirror 14, so that the structure is compact and simple.

The laser emitting unit 100 is installed in a cavity 11 of the base 10, and comprises a laser light source 101, a third mirror 102, a first convex lens 103 and a fourth mirror 104. The light emitted by the laser light source 101 passes through the third mirror 102, the first convex lens 103 and the fourth mirror 104 in turn, and is reflected by the fourth mirror 104 to reach the second mirror 14 disposed at the edge of the interior of the diffuser 9, the second mirror 14 reflects the light to the first mirror 13 at the top center of the interior of the diffuser 9, and the light reflected by the first mirror 13 is projected to the upper reflecting plane mirror 2 along the central axis S.

The laser receiving unit 200 is installed in the cavity 11 of the base 10, and comprises a fifth mirror 201, a second convex lens 202, a sixth mirror 203 and a distance measuring sensor 204; the received light L2 formed from the lower reflecting plane mirror 3 enters the fifth mirror 201, the second convex lens 202 and the sixth mirror 203 in turn along the central axis S and then enters the distance measuring sensor 204. The laser emitting unit 100 and the laser receiving unit 200 are disposed in the cavity 11 of the base 10, so that the structure is compact and small, power can be supplied conveniently, wireless power supply is not needed, the cost is reduced, and the circuit is simplified.

The rotary base 1 is driven by a driving mechanism, which includes a motor 4, a pinion 5, a gear 6 and a bearing 7, wherein the gear 6 has an inner cavity 61 at the center, the bearing 7 fits into the inner cavity 61 of the gear 6, a through hole 71 is formed in the center of the bearing 7, the inner wall of the bearing 7 is installed on the top of the base 10, the bottom of the rotary base 1 is installed on the end face of the gear 6, an output shaft of the motor 4 is installed on the pinion 5, the pinion 5 is engaged with the gear 6, the motor 4 drives the pinion 5 and the gear 6 to rotate, the gear 6 drives the rotary base 1 to rotate, and the received light L2 entering the lower reflecting plane mirror 3 passes through the through hole 71 formed in the center of the bearing 7, so that the structure is compact, simple and small.

The bearing 7 is a ball bearing, including an outer race, an inner race and a plurality of balls, wherein the outer race is sleeved in the inner cavity 61 of the gear 6, and the inner race is mounted on the top of the base, which can be easily realized.

Figure 9:
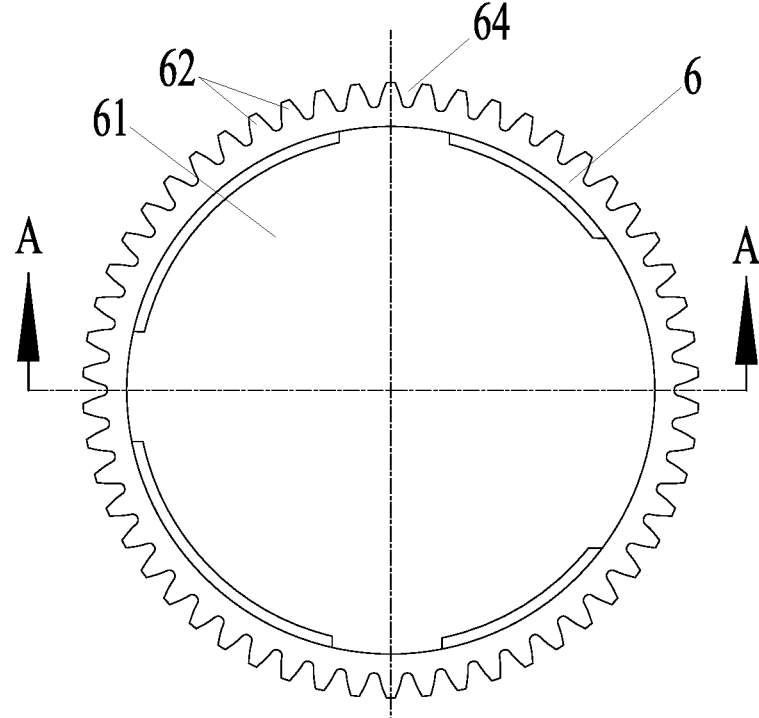
FIG. 9 is a sectional view of the gear of the first embodiment of the invention.
Figure 10:
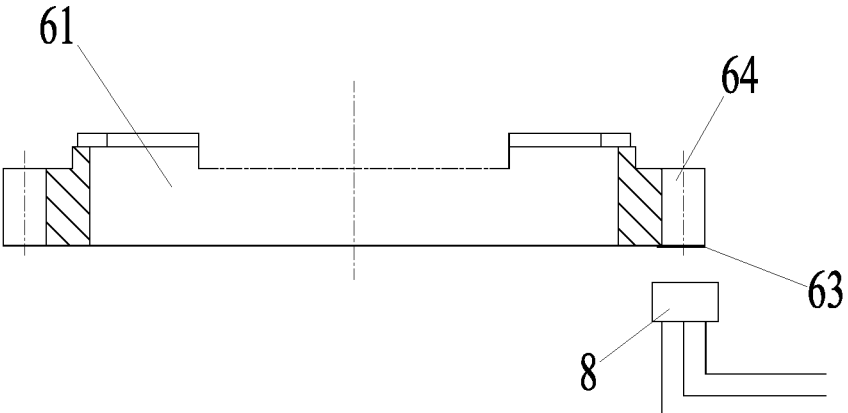
FIG. 10 is a cross-sectional view of A-A of FIG. 9.
Figure 11:
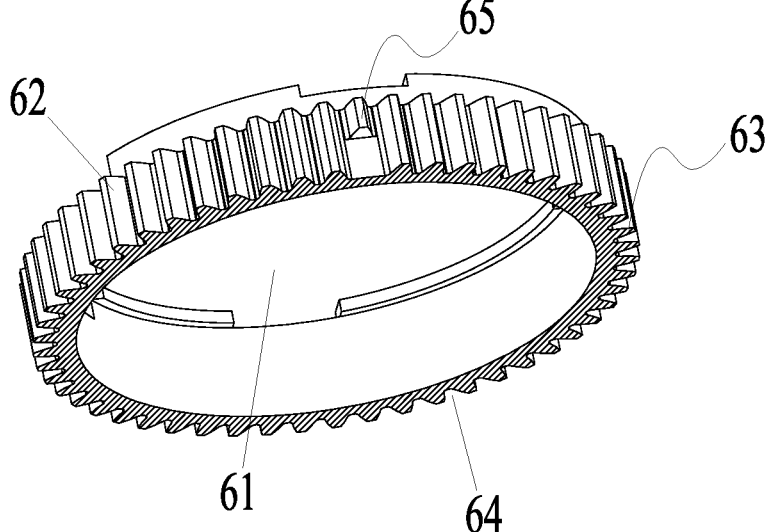
FIG. 11 is a perspective view of the gear of the first embodiment of the invention.

As shown in FIG. 9, FIG. 10 and FIG. 11, the end faces of the teeth 62 on the edge of the gear 6 are coated with reflective paint 63, wherein one short tooth 65 is shorter than the other teeth 62 and is not coated with the reflective paint, the teeth coated with the reflective paint form a counting and coding disk, and a photoelectric sensor 8 is installed under the teeth 62 to detect the rotation angle of the rotary base 1. The teeth 62 and tooth groove 64 pass through the photoelectric sensor 8, and a generated count pulse signal can be converted into angle data, the rotation angle of the detection rotary base 1 can be acquired accurately, the structure is simple, and no special code disk is required, thus reducing the cost.

Both the included angle between the upper reflecting plane mirror 2 and the horizontal line and that between the lower reflecting plane mirror 3 and the horizontal line are 45°, which leads to good reflection.

The bottom of the base 10 is hollowed out to form a cavity 11, the motor 4 is installed in the cavity 11, the pinion 5, gear 6 and the bearing 7 are located outside the cavity 11 and placed on the top end face of the base 10, an annular boss 12 protrudes from the top end face of the base 10, the annular boss 12 fits into the bearing 7, the annular boss 12 has a hollow hole 121 which is communicated with the cavity 11, and the received light L2 passes through the hollow hole 121, so that the structure is compact and reasonable.

The laser emitting unit 100 and the laser receiving unit 200 are fixedly installed in the cavity 11 of the base 10, so that the structure is compact and small structure, power can be supplied conveniently supply, signals can be transmitted conveniently (without wireless signal transmission), no wireless power supply is required, thus saving the cost and simplifying circuit.

Embodiment 2

Figure 12:
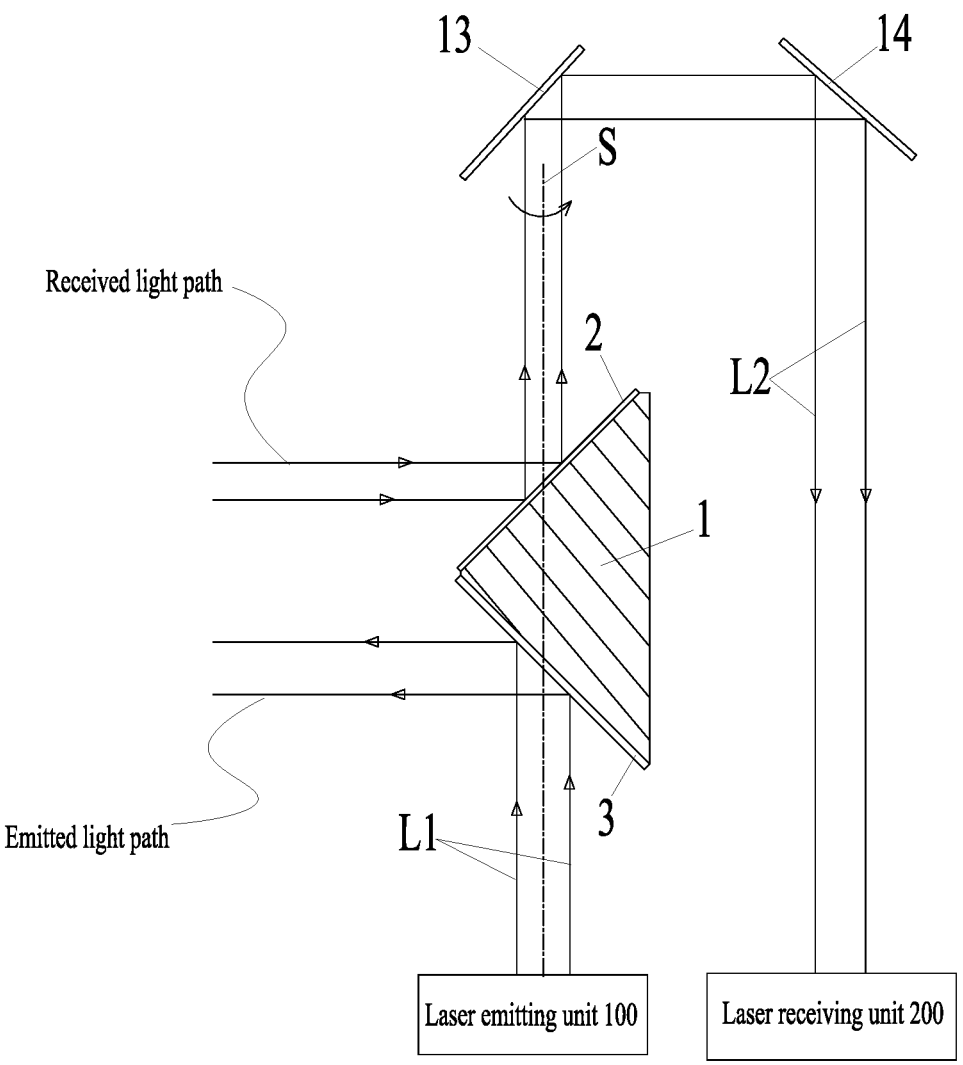
FIG. 12 is a schematic diagram of a second embodiment of the invention.

This embodiment is a modification on the basis of the first embodiment. According to the principle of reversible optical path, the new technical solution is as follows: As shown in FIG. 12, the lidar system capable of realizing 360° rotary scanning comprises a laser emitting unit 100, a laser receiving unit 200, a rotary base 1, an upper reflecting plane mirror 2 and a lower reflecting plane mirror 3, wherein the upper reflecting plane mirror 2 and the lower reflecting plane mirror 3 are arranged vertically and obliquely installed at an angle of 45° on the same side of the rotary base 1, and rotate around the vertical central axis S of the rotary base 1; the emitting light L1 emitted by the laser emitting unit 100 is projected on the lower reflecting plane mirror 3 along the central axis S and then reflected laterally, and the light reflected back from an external object is projected laterally on the upper reflecting plane mirror 2 to form the received light L2 along the central axis S; the received light L2 is reflected by a second mirror 14 and a first mirror 13 and then enters the laser receiving unit 200; the received light L2 and the emitting light L1 are located on two sides of the rotary base 1; and the laser emitting unit 100 and the laser receiving unit 200 are located at the same end of the central axis S. Electronic components such as the laser emitting unit 100 and the laser receiving unit 200 do not rotate with the rotary base 1, thus ensuring the stability, reliability and service life of the electronic components. There is no scanning blind area or obstacle when the rotary base rotates 360°, and in the meantime wireless power supply and signal transmission are not required.

It should be noted that all directional indications such as "upper", "lower", "front", "back", "left" and "right" in the embodiment of the invention are only used to explain the relative positional relationship and movement of all components in a specific posture (as shown in the attached drawings), and if the specific posture changes, the directional indication will also change accordingly.

In the invention, unless otherwise specified and defined, the terms "connect" and "fix" shall be understood in a broad sense. For example, "fix" can be a fixed connection, a detachable connection, or an integrated structure; it can be a mechanical connection or an electrical connection; it can be a direct connection or indirect connection through an intermedium, an internal connectivity between two elements or an interaction relation between two elements, unless otherwise specified. For those skilled in the art, the specific meaning of the terms in the invention can be understood in combination with specific circumstances.

The above embodiments are the preferred ones of the invention, but the embodiments of the invention are not limited to these. Any other changes, modifications, substitutions, combinations and simplifications made without departing from the spirit and principle of the invention are equivalent substitutions, which are included in the scope of protection of the invention.

What is claimed is:

1. A lidar system capable of realizing 360° rotary scanning, comprising a laser emitting unit (100), a laser receiving unit (200) a rotary base (1), an upper reflecting plane mirror (2) and a lower reflecting plane mirror (3), wherein the upper reflecting plane mirror (2) and the lower reflecting plane mirror (3) are arranged vertically and obliquely installed on the same side of the rotary base (1), and rotate around a vertical central axis S of the rotary base (1); an emitting light L1 emitted by the laser emitting unit (100) is reflected by a second mirror (14) and a first mirror (13), then projected on the upper reflecting plane mirror (2) along a central axis S, and then horizontally reflected out, and the reflected light reflected back from an external object is horizontally projected on the lower reflecting plane mirror (3) to form a received light L2 which enters the laser receiving unit (200) along the central axis S; the received light L2 and the emitting light L1 are located on two sides of the rotary base (1); and the laser emitting unit (100) and the laser receiving unit (200) are located at the same end of the central axis S, wherein the rotary base (1) is installed on a base (10) and covered with a diffuser (9), a first mirror (13) is disposed at a top center of an interior of the diffuser (9), a second mirror (14) is disposed at a top edge of the interior of the diffuser (9), and the first mirror (13) is located directly above the upper reflecting plane mirror (2), and is opposite to the second mirror (14);

the laser emitting unit (100) is installed in a cavity (11) of the base (10), and comprises a laser light source (101), a third mirror (102), a first convex lens (103) and a fourth mirror (104); a light emitted by the laser light source (101) passes through the third mirror (102), the first convex lens (103) and the fourth mirror (104) in turn, and is reflected by the fourth mirror (104) to reach the second mirror (14) at an edge of the diffuser (9), the second mirror (14) reflects the light to the first mirror (13) at the top center of the interior of the diffuser (9), and the light reflected by the first mirror (13) is projected to the upper reflecting plane mirror (2) along the central axis S;

the laser receiving unit (200) is also installed in the cavity (11) of the base (10), and comprises a fifth mirror (201), a second convex lens (202), a sixth mirror (203) and a distance measuring sensor (204); the received light L2 formed from the lower reflecting plane mirror (3) enters the fifth mirror (201), the second convex lens (202) and the sixth mirror (203) in turn along the central axis S and then enters the distance measuring sensor (204);

the rotary base (1) is driven by a driving mechanism, which comprises a motor (4), a pinion (5), a gear (6) and a bearing (7), an inner cavity (61) is formed in a center of the gear (6) the bearing (7) fits into the inner cavity (61) of the gear (6), a through hole (71) is formed in a center of the bearing (7), an inner wall of the bearing (7) is installed on atop of the base (10), a bottom of the rotary base (1) is installed on an end face of the gear (6), an output shaft of the motor (4) is installed on the pinion (5), the pinion (5) is engaged with the gear (6), the motor (4) drives the pinion (5) and the gear (6) to rotate, the gear (6) drives the rotary base (1) to rotate, and the received light L2 entering the lower reflecting plane mirror (3) passes through the through hole (71) formed in the center of the bearing (7);

the bearing (7) is a ball bearing which comprises an outer race, an inner race and a plurality of balls, the outer race is sleeved in the inner cavity (61) of the gear (6), and the inner race is installed on the top of the base (10); and end faces of teeth (62) on an edge of the gear (6) are coated with reflective paint (63), a short tooth (65) is shorter than the other teeth (62) and is not coated with the reflective paint, the teeth coated with the reflective paint form a counting and coding disk, and a photoelectric sensor (8) is installed under the teeth (62) to detect a rotation angle of the rotary base (1).

2. The lidar system capable of realizing 360° rotary scanning according to claim 1, wherein both an included angle between the upper reflecting plane mirror (2) and the horizontal line and that between the lower reflecting plane mirror (3) and the horizontal line are 45°.

3. The lidar system capable of realizing 360° rotary scanning according to claim 2, wherein a bottom of the base (10) is hollowed out to form a cavity (11), the motor (4) is installed in the cavity (11), the pinion (5), the gear (6) and the bearing (7) are located outside the cavity (11) and placed at the top of the base (10), an annular boss (12) protrudes from a top end face of the base (10), the annular boss (12) fits into the bearing (7), the annular boss (12) has a hollow hole (121) which is communicated with the cavity (11), and the received light L2 passes through the hollow hole (121).

\* \* \* \* \*